(12) United States Patent
Maier et al.

(10) Patent No.: US 12,023,995 B2
(45) Date of Patent: Jul. 2, 2024

(54) VENTILATION SYSTEM FOR A VEHICLE INTERIOR

(71) Applicant: Bayerische Motoren Werke Aktiengesellschaft, Munich (DE)

(72) Inventors: David Maier, Munich (DE); Maximilian Sperling, Unterhaching (DE); Achim Stampflmeier, Neufahrn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 328 days.

(21) Appl. No.: 17/271,702

(22) PCT Filed: Jul. 26, 2019

(86) PCT No.: PCT/EP2019/070239
§ 371 (c)(1),
(2) Date: Feb. 26, 2021

(87) PCT Pub. No.: WO2020/048681
PCT Pub. Date: Mar. 12, 2020

(65) Prior Publication Data
US 2021/0316600 A1 Oct. 14, 2021

(30) Foreign Application Priority Data
Sep. 7, 2018 (DE) ...................... 10 2018 215 201.2

(51) Int. Cl.
*B60H 3/00* (2006.01)
*B60H 1/00* (2006.01)
(Continued)

(52) U.S. Cl.
CPC ............ *B60H 3/0078* (2013.01); *B60H 1/00* (2013.01); *B60H 1/242* (2013.01); *B60H 1/247* (2013.01); *B60H 1/26* (2013.01)

(58) Field of Classification Search
CPC ...... B60H 3/0078; B60H 3/0071; B60H 1/00; B60H 1/242; B60H 1/247; B60H 1/26; B60H 1/3414; B60H 2001/3471
See application file for complete search history.

(56) References Cited

U.S. PATENT DOCUMENTS

| 4,789,801 A | 12/1988 | Lee |
| 6,951,582 B1 * | 10/2005 | Tsai ........................ B03C 3/68 96/21 |

(Continued)

FOREIGN PATENT DOCUMENTS

| AR | 032161 A1 | 10/2003 |
| CN | 103822305 A | 5/2014 |

(Continued)

OTHER PUBLICATIONS

International Search Report (PCT/ISA/210) issued in PCT Application No. PCT/EP2019/070239 dated Oct. 31, 2019 with English translation (four (4) pages).

(Continued)

*Primary Examiner* — Emmanuel E Duke
(74) *Attorney, Agent, or Firm* — Crowell & Moring LLP

(57) ABSTRACT

A ventilation system for a vehicle interior has an air guide for guiding air into the vehicle interior, an ionization device for ionizing the air in the air guide, an air outlet for transferring the air from the air guide into the vehicle interior, and a deflecting device in the air outlet, designed to produce an electric and/or magnetic field, for deflecting the ionized air.

9 Claims, 5 Drawing Sheets

(51) Int. Cl.
    *B60H 1/24*    (2006.01)
    *B60H 1/26*    (2006.01)

(56) References Cited

U.S. PATENT DOCUMENTS

| | | | |
|---|---|---|---|
| 2012/0214395 A1 | | 8/2012 | Rais et al. |
| 2016/0361972 A1 | * | 12/2016 | Blackley ............ B60H 1/00785 |

FOREIGN PATENT DOCUMENTS

| | | | | | |
|---|---|---|---|---|---|
| CN | 104247180 A | * | 12/2014 | ............ | H01T 19/00 |
| CN | 106256576 A | | 12/2016 | | |
| CN | 206656431 U | | 11/2017 | | |
| DE | 10 2009 038 298 A1 | | 3/2011 | | |
| DE | 102009038298 A1 | * | 3/2011 | ......... | B60H 1/00564 |
| DE | 10 2010 049 110 A1 | | 6/2011 | | |
| DE | 102011119843 A1 | * | 4/2013 | ............ | B01D 53/04 |
| DE | 10 2014 102 826 A1 | | 9/2015 | | |
| DE | 10 2016 000 666 A1 | | 7/2017 | | |
| DE | 102016000666 A1 | * | 7/2017 | | |
| GB | 1 203 797 A | | 9/1970 | | |
| JP | 2003-151718 A | | 5/2003 | | |
| JP | 2007066795 A | * | 3/2007 | | |
| KR | 10-2011-0052472 A | | 5/2011 | | |

OTHER PUBLICATIONS

German-language Written Opinion (PCT/ISA/237) issued in PCT Application No. PCT/EP2019/070239 dated Oct. 31, 2019 (six (6) pages).

German-language Search Report issued in German Application No. 10 2018 215 201.2 dated May 23, 2019 with partial English translation (11 pages).

English translation of Chinese-language Office Action issued in Chinese Application No. 201980057327.3 dated May 11, 2023 (8 pages).

* cited by examiner

VENTILATION SYSTEM FOR A VEHICLE INTERIOR

BACKGROUND AND SUMMARY OF THE INVENTION

The present invention relates to a ventilation system for a vehicle interior.

Ventilation systems for vehicle interiors, for example for passenger motor vehicles, typically have an air outlet at which the air, optionally in a cooled or heated state, flows into the vehicle interior. In most cases, adjustable elements, for example lamellas, for directing the air flow in a specific direction are situated at this air outlet.

It is an object of the present invention to provide a ventilation system for a vehicle interior that, along with a corresponding visual appeal, enables an efficient and comfortable ventilation of the vehicle interior.

The object is achieved by the features of the independent claim. Preferred design embodiments of the invention are the subject matter of the dependent claims.

The object is thus achieved by a ventilation system for a vehicle interior. The ventilation system comprises an air guide unit which is provided for guiding air into the vehicle interior. This air guide unit extends in particular from a fan into the vehicle interior. The air guide unit herein can be formed by one duct or a plurality of ducts. The ventilation system furthermore comprises at least one air outlet. The air outlet is configured for guiding the air from the air guide unit into the vehicle interior. This air outlet thus forms in particular the vehicle-interior-proximal end of the air guide unit. The ventilation system furthermore comprises at least one ionization device in the air guide unit. The ionization device is configured for ionizing the air. The ionization device is disposed upstream of the air outlet, in particular between the fan and the air outlet. Following the ionization device, the air guide unit can also branch out to a plurality of air outlets.

The ventilation system furthermore comprises at least one deflection device in the air outlet. One deflection device may be disposed in each air outlet if a plurality of air outlets are used. The deflection device is configured for generating an electric and/or magnetic field for deflecting the ionized air. Depending on the actuation of the deflection device, the inflowing air can be directed in a specific direction on account of the air flowing into the vehicle interior being ionized and by the electric and/or magnetic field in the deflection device. The field herein attracts the ionized component parts of the air or repels the ionized component parts of the air, and thus directs the air flow in the desired direction.

"Deflection" is in particular to be understood to be a variation of the flow direction of the air from the air outlet into the vehicle interior.

In principle, the deflection device for generating an electric and/or magnetic field can be of any arbitrary design. In the case of static and low-frequency fields, the electric and the magnetic component are typically considered separately from one another. In the case of high-frequency fields, the two components are tightly intercoupled such that reference is made to electromagnetic fields. The description pertaining to an electric and/or magnetic field of the deflection device thus describes that the deflection device generates an electric field and/or a magnetic field and/or an electromagnetic field. It is thus also possible for the deflection device to have two different components for generating two fields such that a static electric field and a static magnetic field are generated in the deflection device, for example.

For generating the field, the deflection device preferably comprises at least one field-generating element. The field-generating element is, for example, a solenoid, a permanent magnet, or an electrode. Furthermore, two or more field-generating elements can also be used here, for example two mutually opposite capacitor plates. Dissimilar fields can thus be generated, depending on how these field-generating elements are energized (with the exception of the permanent magnet). For example, energizing a coil with high frequency generates an electromagnetic field. The static energizing of the capacitor plates generates predominantly a static electric field.

It is preferably provided that the deflection device for varying the deflection of the air is configured for varying the field. The deflection device is in particular configured for varying a field intensity of the field, and/or a frequency of the field, and/or a wavelength of the field, and/or a direction of the field. To this end, the ventilation system comprises in particular a control unit which in turn actuates the deflection device, or the field-generating element disposed therein, respectively.

The variation of the field in the deflection device is preferably possible in steps or in a stepless manner. The control unit that is preferably to be used is correspondingly configured.

As has already been mentioned, the deflection device preferably comprises at least one field-generating element. For varying the field, a voltage applied to the field-generating element is preferably varied, and/or an amperage supplied to the field-generating element is varied. This variation of the voltage or amperage, respectively, preferably takes place by means of the control unit mentioned.

It is furthermore preferably provided that the deflection device, additionally to the field-generating element, comprises at least one actuator. The field-generating element for varying the field herein is able to be moved by means of the actuator. For example, the field-generating element is a coil which is moved by the actuator so as to vary the alignment and/or the intensity of the field in relation to the ionized air flow. According to a further potential example, the field is generated by two mutually opposite capacitor plates. At least one of the capacitor plates herein is in this instance able to be moved by the actuator in order for the alignment and/or the intensity of the field to be varied.

It is moreover preferably provided that the deflection device comprises at least one actuator in combination with a field-impedance element. The field-impedance element is configured for shielding the field at least in a parallel manner. For example, the field-impedance element is an electrical isolator which by means of the actuator is moved in the field. The direction and/or the intensity of the field are/is changed as a function of the position of the field-impedance element in the field. The flow direction of the air can also be varied on account thereof.

It is moreover preferably provided that the deflection device by means of at least two field-generating elements generates a field which generates the deflection by means of an electric phase shift. The field-generating elements herein are in particular coils, capacitor plates, antennae or waveguides with radiation. The electric phase shift herein is preferably created between stationary waves, or a phase shift between the field-generating elements is used.

The ionization device for ionizing the flowing air preferably comprises at least one of the following elements: a plasma generator, and/or a hot wire/glow wire, and/or a spark gap generator, and/or a highly energized electromagnetic field, and/or chemical substances for ionizing the air, and/or a radioactive element, in particular an alpha emitter, for ionizing the air. The use of the radioactive element herein is listed only for the sake of completeness. The radioactive element is usually dispensed with in order to avoid any corresponding exposure to radiation.

The ventilation system preferably comprises a neutralizing device which is disposed downstream of the deflection device. The neutralizing device herein can likewise be situated in the air outlet. The neutralizing device is configured for reducing the ionization of the air. The ionization device comprises in particular a field emitter in order for the ionization of the air to be reduced.

The invention furthermore comprises a vehicle, in particular a road-going vehicle, comprising the ventilation system described.

Further details, features and advantages of the invention are derived from the description hereunder and from the figures.

DETAILED DESCRIPTION OF THE DRAWINGS

A ventilation system 2 in a vehicle 1 will be described in detail hereunder by means of FIGS. 1 to 4.

Figure 1:
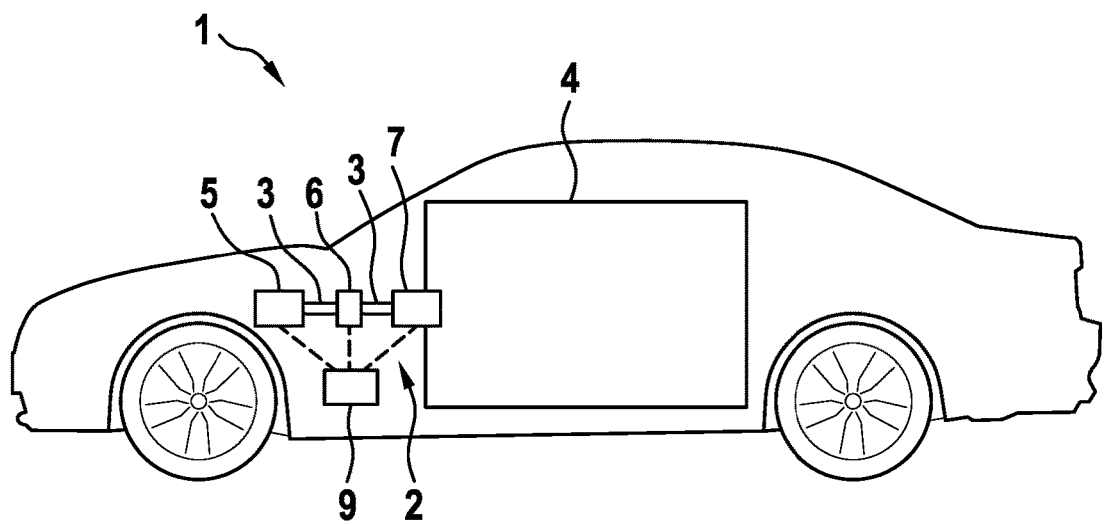
FIG. 1 is a schematic view of a ventilation system according to an exemplary embodiment in a vehicle.

FIG. 1 shows the vehicle 1 having the ventilation system 2 disposed therein. The ventilation system 2 comprises an air guide unit 3 and a fan 5. The air guide unit 3 leads from the fan 5 up to an air outlet 7 of the ventilation system 2. For the sake of simplicity, only one air outlet 7 is shown here. In fact, the air guide unit 3 can also branch out to a plurality of air outlets 7.

The air can flow into a vehicle interior 4 by way of the at least one air outlet 7.

Figure 2:
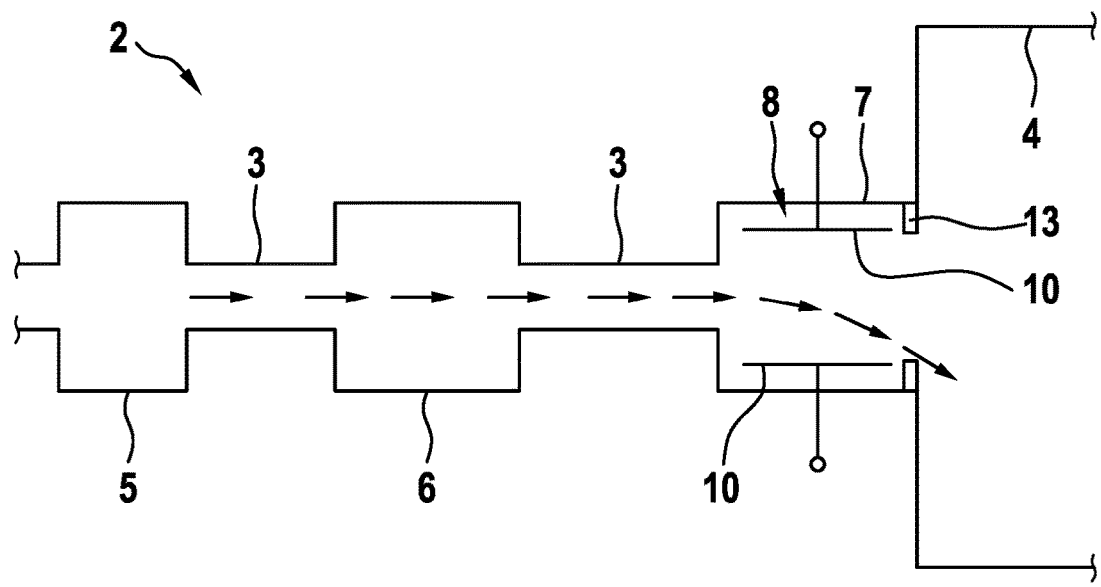
FIG. 2 shows the ventilation system according to the invention from FIG. 1 in detail.

The ventilation system 2 according to the detailed illustration in FIG. 2 comprises an ionization device 6 in the air guide unit 3. The ionization device 6 is configured for ionizing the air that flows in the direction of the vehicle interior 4.

FIG. 2 furthermore shows that a deflection device 8 is disposed at the vehicle-interior-proximal end of the air guide unit 3. The deflection device 8 is configured for directing the airflow in a specific direction in the vehicle interior 4.

To this end, the deflection device 8 comprises at least one field-generating element 10 for generating an electric and/or magnetic field. In the example shown, there are two mutually opposite capacitor plates between which the air flows and is deflected.

A current and/or a voltage on the field-generating element 10 is varied by way of the control unit 9 which is schematically illustrated in FIG. 1, so as thus to also vary the field and consequently the deflection of the air.

Figure 3:
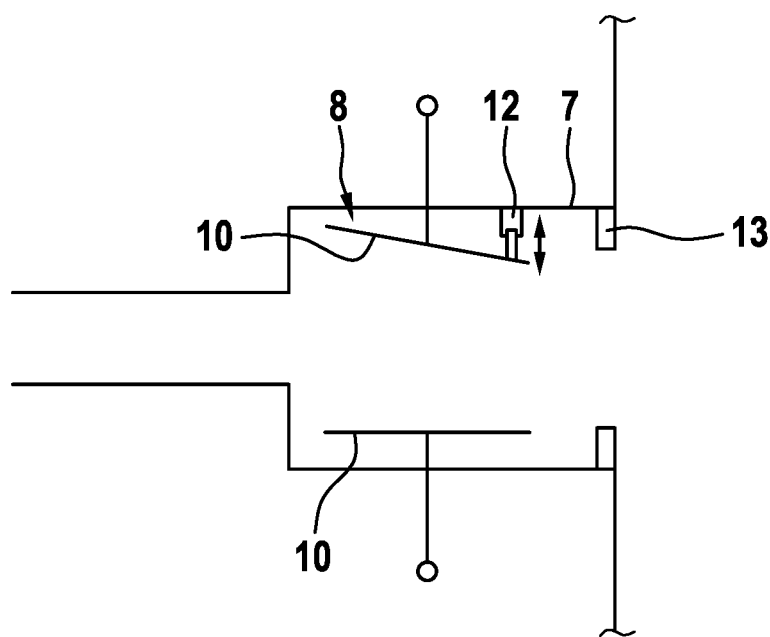
FIGS. 3 and 4 show two dissimilar variants for the design embodiment of a deflection device of the ventilation system according to the exemplary embodiment.

FIG. 3 shows a variant of the deflection device 8 having an actuator 12. One of the field-generating elements 10 here is able to be moved by way of the actuator 12. The direction and/or the intensity of the generated field can be varied by moving the field-generating element 10. The direction of the flowing air is also varied on account thereof.

Figure 4:
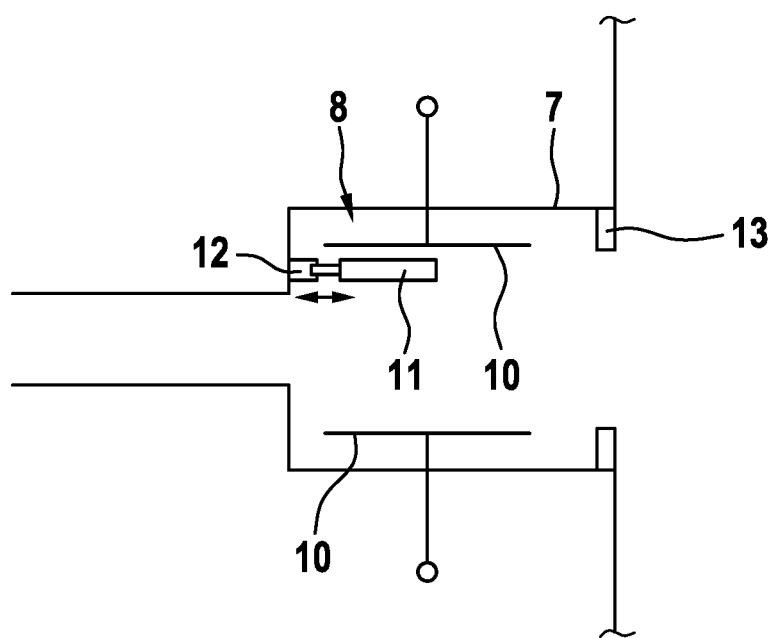

FIG. 4 shows a further variant of the deflection device 8 having an actuator 12. In this example, the deflection device 8 comprises a field-impedance element 11 in the field. The field-impedance element 11 here is an electric isolator, for example. The field-impedance element 11 can be moved in the field by way of the actuator 12, on account of which the field and thus also the deflection of the air is varied.

The figures furthermore show the optional use of a neutralizing device 13 which enables the ionization of the air downstream of the deflection device 8 to be further reduced.

Figure 5:
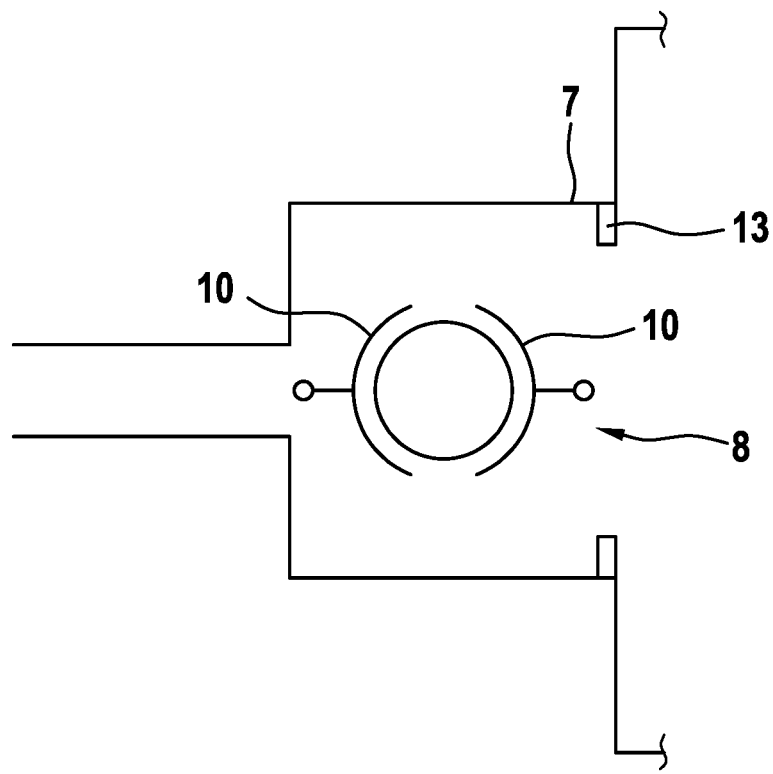
FIGS. 5 to 10 show different variants for the design embodiment of the field-generating elements and for the corresponding electrical deflection.

FIG. 5 shows a variant of the deflection device 8 having two field-generating elements 10 which, in the form of semicircular capacitor plates, are disposed so as to be centric. The two field-generating elements 10 here can be supported on a centric part of the housing of the air outlet 7, for example. It is in particular provided in this variant that the housing of the air outlet 7 is metallic, in particular on the inside. This takes place, for example, by way of a metallic coating. The housing of the air outlet 7 is electrically charged by way of the two field-generating elements 10 so as thus to achieve the desired deflection of the ionized air.

Figure 6:
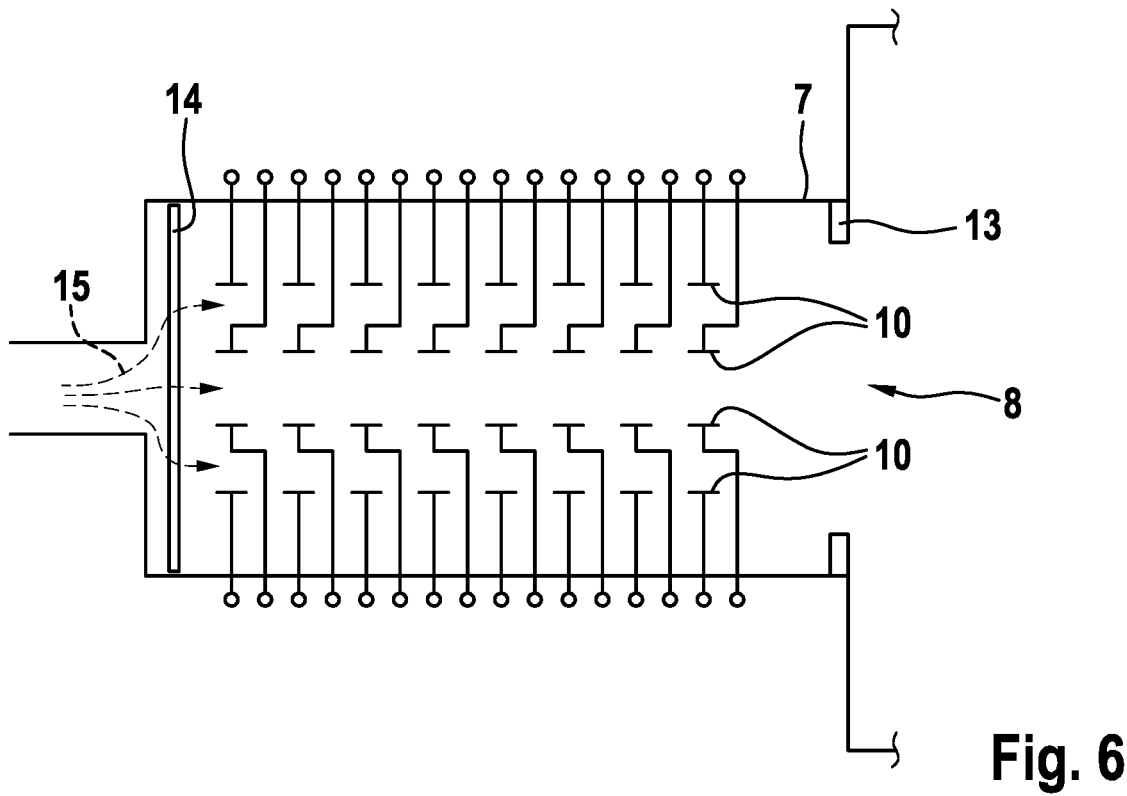

FIG. 6 shows a variant of the deflection device 8 having a multiplicity of field-generating elements 10. In particular, more than two field-generating elements 10 are disposed so as to be transverse to the flow direction. Moreover, more than two field-generating elements 10 are disposed along the flow direction. The field-generating elements 10 here are individually actuatable such that, depending on the actuation, a plurality of paths 15 in which the ionized air can be directed result. In the example shown, field-generating elements 10 are disposed so as to be transverse to the flow direction, on account of which, depending on the actuation, three paths 15 for directing the air result.

Figure 7:
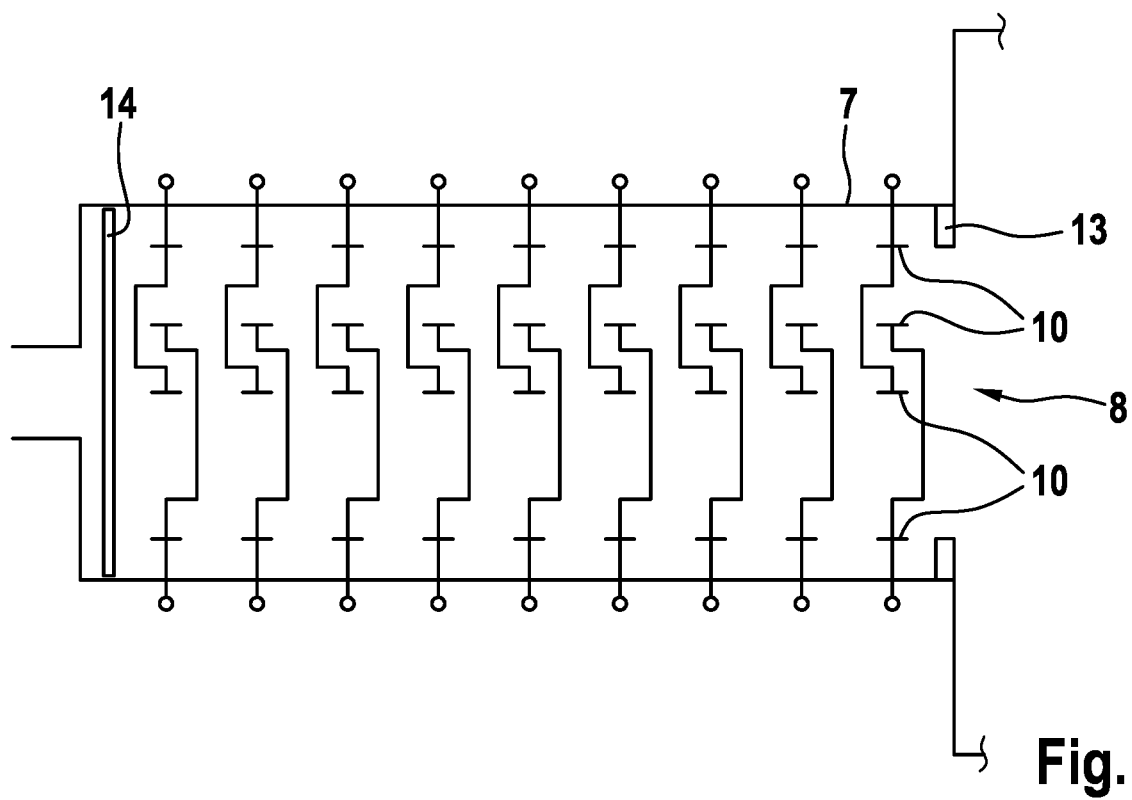

FIG. 7 shows a variant similar to that of FIG. 6. With a view to a simple design embodiment, it is shown in FIG. 7 that a plurality of the field-generating elements 10 can be actuated in groups.

FIGS. 6 and 7 in an exemplary manner for all variants furthermore show the optional use of a flow rectifier 14. The flow rectifier 14, for example on account of the geometric design embodiment thereof having deflector elements, distributes the flow at the beginning of the air outlet 7 to the entire diameter.

Figure 8:
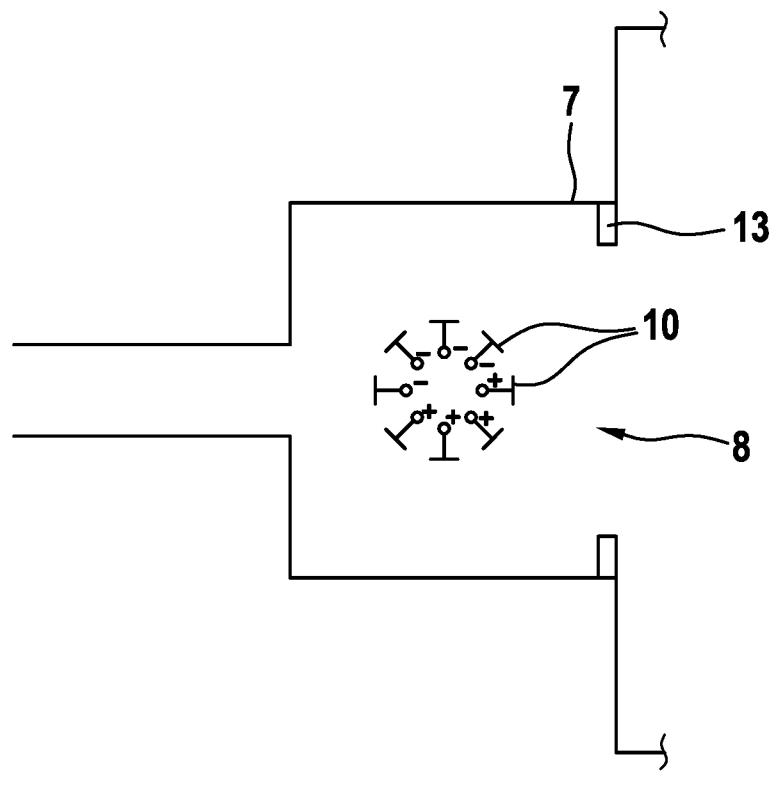

FIG. 8 shows a variant of the deflection device 8 in which more than two field-generating elements are disposed in the center of the air outlet 7. This plurality of field-generating elements 10 here conjointly form in particular an annular shape or a spherical shape and are actuatable individually or in groups.

Figure 9:
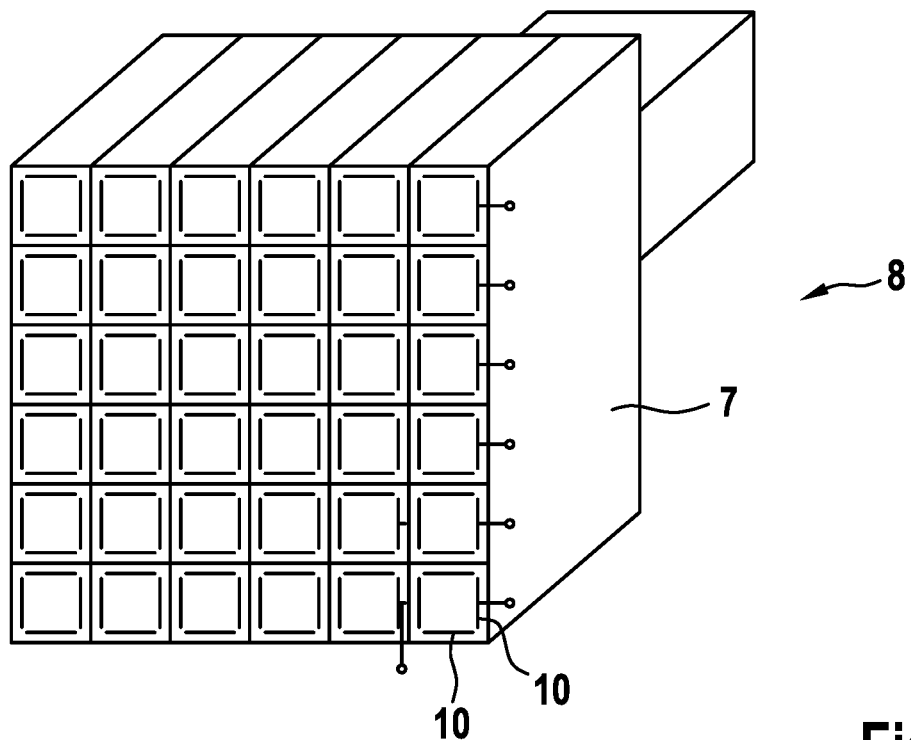
Figure 10:
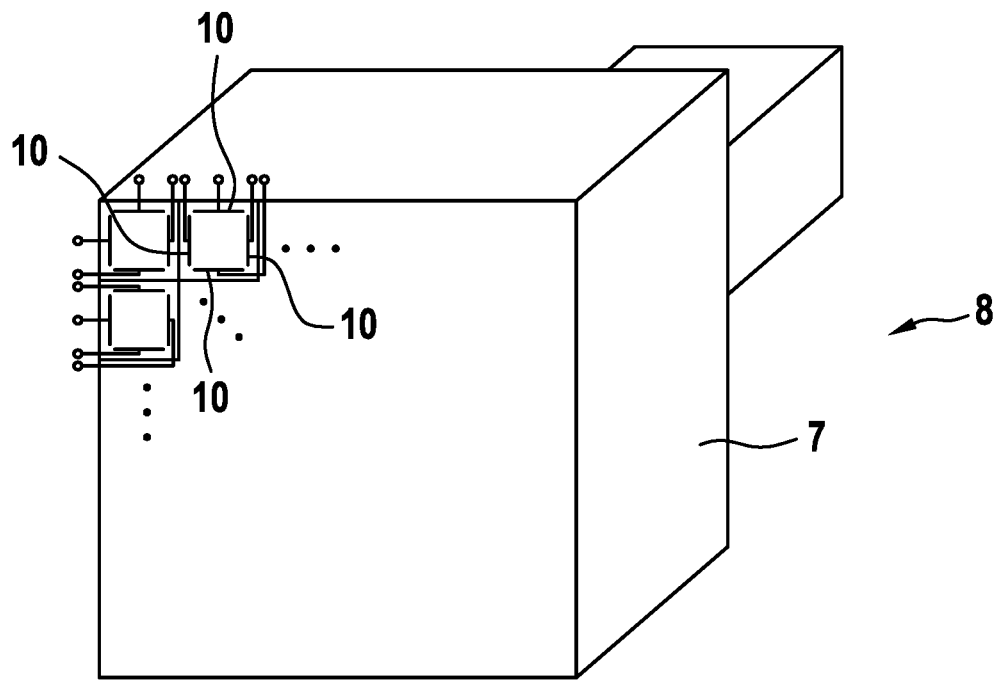

FIG. 9 shows a variant in which the deflection device 8 on account of a honeycomb-shaped structure subdivides the cross section of the air outlet 7 into a multiplicity of individual air ducts. As is in particular shown in the detailed illustration in FIG. 10, a plurality of field-generating elements 10 are present in each individual air duct and thus in each individual "honeycomb cell". On account thereof, a dedicated field can be generated in each individual air duct, and the flow can be deflected in each individual air duct, or in each individual honeycomb cell, respectively.

LIST OF REFERENCE SIGNS

1 Vehicle
2 Ventilation system
3 Air guide unit
4 Vehicle interior
5 Fan
6 Ionization device
7 Air outlet
8 Deflection device
9 Control unit
10 Field-generating elements
11 Field impedance element
12 Actuator
13 Neutralizing device
14 Flow rectifier
15 Paths

What is claimed is:

1. A ventilation system for an automobile interior, comprising:
   an air guide unit configured to guide external air relative to the automobile into the automobile interior;
   an ionization device configured to ionize the external air in the air guide unit;
   an air outlet configured to transfer the external air from the air guide unit into the automobile interior; and
   a deflection device in the air outlet, configured to generate an electric and/or magnetic field for deflecting the external air that has been ionized.

2. The ventilation system according to claim 1, wherein for varying the deflection of the air, the deflection device is configured for varying at least one of:
   a field intensity of the field,
   a frequency of the field,
   a wavelength of the field, or
   a direction of the field.

3. The ventilation system according to claim 1, wherein the deflection device for varying the field is configured in a plurality of steps or so as to be stepless.

4. The ventilation system according to claim 1, wherein the deflection device comprises at least one field-generating element,
   wherein for varying the field:
   a voltage applied to the field-generating element is variable; and/or
   an amperage supplied to the field-generating element is variable.

5. The ventilation system according to claim 1, wherein the deflection device comprises at least one actuator and at least one field-generating element, wherein for varying the field the field-generating element is movable.

6. The ventilation system according to claim 1, wherein the deflection device comprises at least one actuator and at least one field-impedance element for at least partially shielding the field, wherein for varying the field the field-impedance element is movable.

7. The ventilation system according to claim 1, wherein the ionization device for ionizing the air comprises at least one of:
   a plasma generator,
   a hot wire/glow wire,
   a spark gap generator,
   a highly energized electric and/or magnetic field,
   chemical substances, or
   a radioactive element.

8. The ventilation system according to claim 1, further comprising:
   a neutralizing device, downstream of the deflection device, and configured for reducing the ionization of the air.

9. An automobile comprising a ventilation system according to claim 1.

* * * * *